United States Patent
Cok

(10) Patent No.: US 8,477,329 B2
(45) Date of Patent: *Jul. 2, 2013

(54) PRINTING VARIABLE DATA ON A VARIETY OF DIFFERENT PRE-PRINTED STOCKS

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 12/789,519

(22) Filed: May 28, 2010

(65) Prior Publication Data

US 2011/0292431 A1   Dec. 1, 2011

(51) Int. Cl.
  *G06K 15/00* (2006.01)
(52) U.S. Cl.
  USPC .......................................... 358/1.14
(58) Field of Classification Search
  USPC .............................. 358/1.15, 1.14
  See application file for complete search history.

(56) References Cited

U.S. PATENT DOCUMENTS

| | | | |
|---|---|---|---|
| 5,129,639 A | 7/1992 | DeHority | |
| 5,984,193 A | 11/1999 | Uhling | |
| 6,604,017 B1* | 8/2003 | Richardson et al. | 700/223 |
| 6,647,222 B1 | 11/2003 | Digby | |
| 6,726,357 B2 | 4/2004 | Luque | |
| 6,823,147 B2 | 11/2004 | Jackelen et al. | |
| 6,898,395 B2 | 5/2005 | Mui et al. | |
| 7,116,343 B2 | 10/2006 | Botten et al. | |
| 7,630,519 B2 | 12/2009 | Nagarajan | |
| 2008/0240751 A1 | 10/2008 | Miyata | |
| 2009/0257087 A1* | 10/2009 | Honda | 358/1.15 |

* cited by examiner

*Primary Examiner* — Eric A Rust
(74) *Attorney, Agent, or Firm* — Eugene I. Shkuko; Amit Singhal

(57) ABSTRACT

A printing apparatus for variable pre-printed stock stores customer data and two or more different pre-printed stocks. A scanner scans the printed area of the pre-printed stocks and produces tray stock information identifying the stocks. Received electronic customer orders include the customer data and selection data for one or more of the pre-printed stocks. A controller receives the tray stock information and the electronic customer orders for matching the tray stock information to the electronic orders to produce print instructions. A printer receives the print instructions and prints the customer data corresponding to the match onto pre-printed stocks identified by the match.

21 Claims, 6 Drawing Sheets

PRINTING VARIABLE DATA ON A VARIETY OF DIFFERENT PRE-PRINTED STOCKS

CROSS REFERENCE TO RELATED APPLICATIONS

Reference is made to commonly assigned, co-pending U.S. patent application Ser. No. 12/789,515 by Cok et al., filed of even date herewith entitled "Printer With In-Line Scanner", the disclosure of which is incorporated herein by reference in its entirety.

FIELD OF THE INVENTION

The present invention relates to printing variable data on a variety of different pre-printed stocks.

BACKGROUND OF THE INVENTION

Customized mailings and products for consumers can be manufactured by printing variable data on stock material, such as paper. Such print systems typically use a printer having a paper feed path from a media tray holding standardized stock material and an electronically stored data base of customer information. The customer information is printed on the stock material and delivered to the customers. This method is effective for standardized stock material that does not vary or depend on the customer information.

However, there are applications for a variety of different stock materials having custom, pre-printed portions. For example, paper stock that has a printed metal film with a text message outline cannot easily be printed using conventional ink-printing equipment. In this case, customized stock must first be produced using a different printing process and, subsequently, the customized stock is handled and printed with customer data. Each customized stock can have a different stock keeping unit (SKU), quantities of each customized stock element can be very small, and the process by which customer information is printed on the customized stock element can entail a great deal of human handling by printing staff. Hence, printing such products can entail a great deal of work and is prone to error. Furthermore, while paper size, type, and orientation can be properly established and manually entered into a printer memory or connected computer, it is desirable to automate such tasks to prevent errors.

Printers can employ sensors for improving the handling of paper in a paper feed path but these are not useful for identifying or managing stock types. While a printer can have several stock media trays to provide stock to the printer and can have information identifying the stock media (for example as described in U.S. Pat. No. 6,647,222), the stock type information needs to be provided via user or operator input. Several problems may result due to user error in entering an incorrect media type and/or loading incorrect media in the paper drawer or tray.

To some extent, this problem has been recognized in the prior art. U.S. Pat. No. 6,823,147 describes a method for detecting mismatches between printer resources and requirements. U.S. Pat. No. 5,129,639 describes a method of finding the best match for a printer, the job printer requirements, and the printer's paper capabilities or stocks. However, these approaches do not necessarily provide what a customer desires.

U.S. Pat. No. 5,984,193 describes a scannable bar code pattern printed on a sheet of printer media or on a sheet attached to such media. The bar code is then read by a bar code scanner to identify the media and corresponding customer variable information can then be printed on the stock media. This method, however, requires a process for back printing unique codes on the stock in either visible or invisible ink, increasing the cost of the stock. If the bar code is visible, it precludes the possibility of a product printed on both sides of the stock, reducing customer satisfaction with the product. U.S. Pat. No. 6,726,357 describes identifying media by a heat signature. However, if the same media with customized text, for example, is employed, it is unlikely that the customized media can be distinguished by a thermal signature.

There is a need, therefore, for an improved apparatus for printing variable customer information on to a variety of different pre-printed stocks.

SUMMARY OF THE INVENTION

In accordance with a preferred embodiment of the present invention, there is provided a printing apparatus for printing customer data on variable pre-printed stock, comprising storage for the customer data, pre-printed stocks having a printed area and an open area on a common side of the pre-printed stock, a printer tray for holding two or more different pre-printed stocks, a scanner for scanning the printed area of the pre-printed stocks and for producing and storing tray stock information identifying the pre-printed stocks, storage for electronic customer orders. Each electronic customer order includes one or more of the customer data and selection data for one or more of the pre-printed stocks. A controller receives the tray stock information and the electronic customer orders for matching the tray stock information to the electronic customer orders to produce a match, and for producing print instructions for the match. A printer receives the print instructions and prints the customer data corresponding to the match onto pre-printed stock identified by the match. The customer data can include digital images, text, or both. The controller communicates an error message if there is no match between the selection of pre-printed stock and the tray stock information or if there is no pre-printed stock in the printer tray. The printer ink or toner is incompatible with the printed areas of the pre-printed stock because it does not adhere well to the printed areas if the areas are printed with a metal film.

In accordance with another preferred embodiment of the present invention, there is provided a method of printing customer data on pre-printed stock, comprising the steps of loading different pre-printed stocks into a printer tray, with the pre-printed stocks having an open area and a printed area on one side of the pre-printed stocks. The pre-printed stocks are scanned using a scanner and stock tray information is produced and stored. A plurality of electronic orders is received in the printer and each order identifies one or more of the pre-printed stocks and includes customer data. The stock tray information is matched with two or more of the electronic orders to form two or more matches. Print instructions are produced for the two or more matches and the customer data is printed onto the pre-printed stocks identified by the matches.

The present invention has the advantage that variable customer information can be printed on variable pre-printed stock without requiring operator intervention. These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
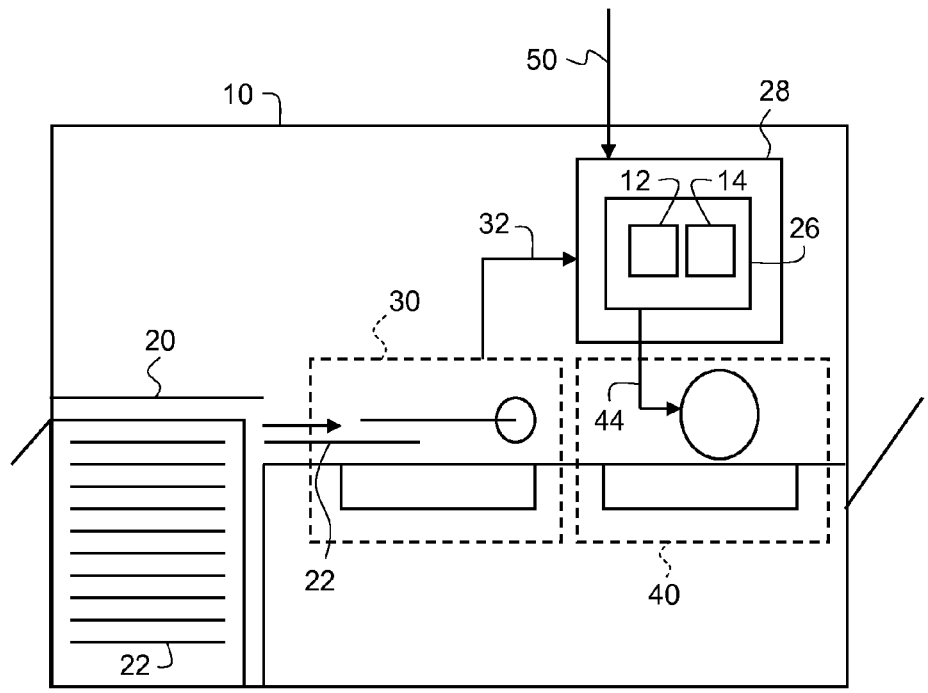
FIG. 1 is a schematic illustration of a printing apparatus in accordance with an embodiment of the present invention.
Figure 2:
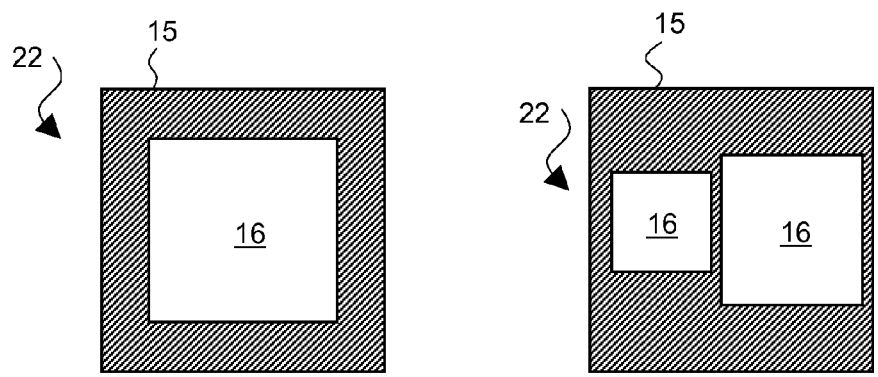
FIG. 2 is a schematic illustration of a pre-printed stock useful with various embodiments of the present invention.
Figure 3:
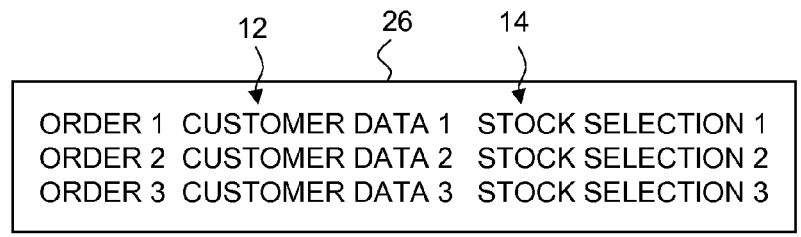
FIG. 3 is a schematic illustration of an electronic order in accordance with an embodiment of the present invention.

Referring to FIG. 1, in one embodiment of the present invention, a printing apparatus 10 for variable pre-printed stock comprises storage for customer data 12 and pre-printed stocks 22. Referring to FIG. 2, each pre-printed stock 22 has a decorative printed area 15 and one or more open areas 16 on a common side of the pre-printed stock 22. In one preferred embodiment of the present invention, the printed areas are printed with a metal film such as a colored foil. The foil surface is incompatible with the printing inks and toners. They are incompatible to the extent that the media doesn't adhere well to the metal foil surface and can undergo smearing or peeling. Referring back to FIG. 1, a printer tray 20 holds the pre-printed stocks 22. A scanner 30 scans the common side of the pre-printed stocks including the printed area 15 of each of the pre-printed stocks 22 and produces tray stock information 32 that identifies each of the pre-printed stocks 22. Electronic customer orders 26 are stored in the printing apparatus 10. Referring to FIG. 3, each electronic customer order 26 includes one or more of the customer data 12 and selection data 14 for one or more of the pre-printed stocks 22.

The scanner 30 can be a linear scanner, for example that translates across a dimension of the stock to form an image of the stock, or an area scanner, for example using an array of pixel sensors to form an image of the stock. Area scanners can be faster while linear scanners can require less space. In either case, the image formed can have a resolution lower than necessary to reproduce an image of the stock. The scanned image produced by the scanner 30 need only have sufficient image quality (e.g. resolution, pixel bit depth, or color) to identify each of the pre-printed stocks 22, for example, by comparing it with pre-stored digital images of known stock and obtaining a stock ID therefor.

The customer orders can be generated electronically, for example though an on-line web page wherein a web user selects a product and transmits the order including customer data. The orders can include a selection of the product type (including a pre-printed stock), a customer digital image, and customer-selected text. The selection of a pre-printed stock 22 is typically made by reviewing images of the pre-printed stock on a web page and selecting the preferred pre-printed stock compatible with the product, for example choosing on the basis of color, theme, and included text. The selected pre-printed stock has an identifier supplied by the manufacturer (e.g. a text string of mixed numbers and letters) that is then included in the customer order and electronically submitted to the printing apparatus. In a more sophisticated embodiment of the present invention, a customer could specify desired attributes of the pre-printed stock rather than identifying the pre-printed stock itself. The attributes can then be included in the electronic customer order and matched to a corresponding pre-printed stock by the printing apparatus of the present invention. For example, keywords can be stored at the printing apparatus corresponding to a supply of pre-printed stock which are then matched to desired attributes submitted by customers.

Figure 4:
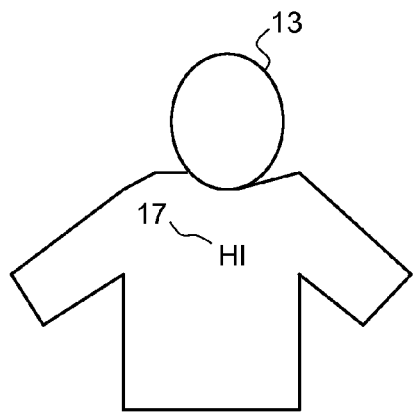
FIG. 4 is a schematic illustration of a digital image with text useful with various embodiments of the present invention.

Referring back to FIG. 1, a controller 28 receives the tray stock information 32 and the electronic customer orders 26, for matching the tray stock information 32 to the electronic customer orders 26 to produce printing instructions 44 for the match. A printer 40 coupled to the controller receives the printing instructions 44 and prints the customer data 12 corresponding to the match onto the matched pre-printed stock 22. In one embodiment of the present invention illustrated in FIG. 4, the customer data 12 includes digital images 13, or text 17, or both.

Figure 5:
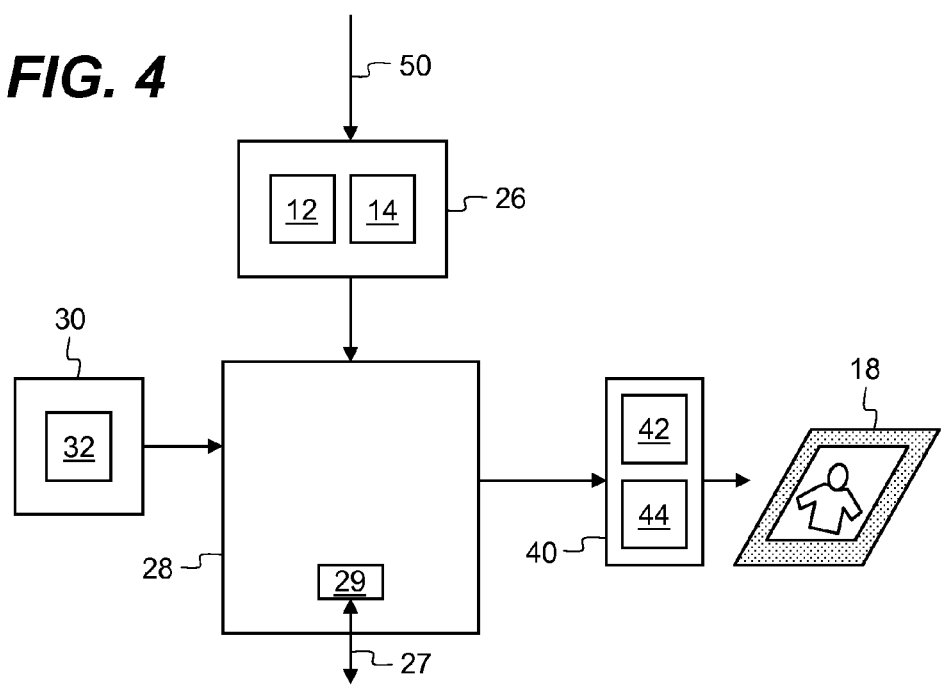
FIG. 5 is a schematic illustration of a portion of a printing apparatus in accordance with an embodiment of the present invention.

Referring to FIG. 5 in more detail, the controller 28 receives electronic customer order 26 information from a computer network 50, the internet, a local computer station, or a portable memory device coupled indirectly to the controller. The electronic customer order 26 information includes customer data 12 and a selection 14 of pre-printed stock. Generally, the customer data 12 includes variable data specific to the customer (e.g. digital images supplied by the customer). The selection 14 of pre-printed stock can be a template selected by the customer into which the customer's digital image is composited and printed in the open area of a pre-printed stock. However, as intended by embodiments of the present invention, a great variety of pre-printed stocks are available, for example including different shapes, colors, pre-printed inks, and pre-printed messages. In some embodiments of the present invention, the variety of pre-printed stocks is too diverse to be loaded by each stock type into the stock printer trays of a printer or local network of printers.

The scanner 30 scans pre-printed stock and, using any of a number of known pattern matching algorithms, identifies the pre-printed stock type by comparing these scanned images to a database of known pre-printed stock items and provides the corresponding tray stock information 32 to the controller 28. (The controller 28 can alternatively perform this task using pre-printed stock images provided by the scanner 30.) The controller 28 can include an operator interface 29 that communicates with an operator with messages 27, e.g. warning messages, status reports, error indicators, and the like. The controller 28 can include programming for communicating an error, for example, if there is no match between the selection 14 of pre-printed stock and the tray stock information 32 or if no appropriate pre-printed stock is loaded in the printer tray.

The scanner 30 (or related controller 28) system can include a database of stored images of pre-printed stock or image information that identifies or describes each pre-printed stock and serves as a basis for comparison with a scanned image of each pre-printed stock from the printer tray. The scanned image is compared with stored database image information to identify the pre-printed stock. Such comparisons can be done using image processing hardware designed for pattern matching and can include comparing the printed areas of the stored image with the printed areas of the scanned image. The comparisons can include color, shape of printed areas, objects found in the scanned image, and so on as is known in the image processing arts. Once a match between the scanned image and the stored database image is found, a pre-printed stock identifier is then stored as part of the tray stock information.

Figure 6:
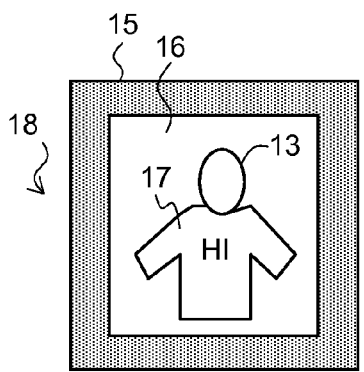
FIG. 6 is a schematic illustration of a product made according to an embodiment of the present invention.

The controller 28 attempts to match one of the pre-printed stock identified in the tray stock information 32 with a pre-printed stock selection 14 found within an electronic customer order 26. The match can be a precise identification of the pre-printed stock or a match of a description of the pre-printed stock. When a match 42 is found, the controller 28 creates printing instructions 44 that are transmitted with the matching information (e.g. including the customer data and pre-printed stock information) to the printer 40. The printer 40 then employs the printing instructions 44 to print the customer data 12 within the open area or areas 16 of the pre-printed stock to form a printed image product 18 that contains the customer data 12 (e.g. a digital image 13 and/or text 17), shown in more detail in FIG. 6.

Printing and scanning equipment are known in the art, as are controllers, printer trays, mechanisms for picking and feeding stock through a paper path, and controllers with computing and memory resources for receiving customer order information, digital images, and tray stock information.

The apparatus and method of the present invention is particularly useful when the variable customer data printer 40 cannot print on the printed areas 15 of the pre-printed stock 22 due to its physical incompatibility with printer ink or toner. In one example, the printed areas 15 are printed with a material other than ink, for example a metal film.

Figure 7:
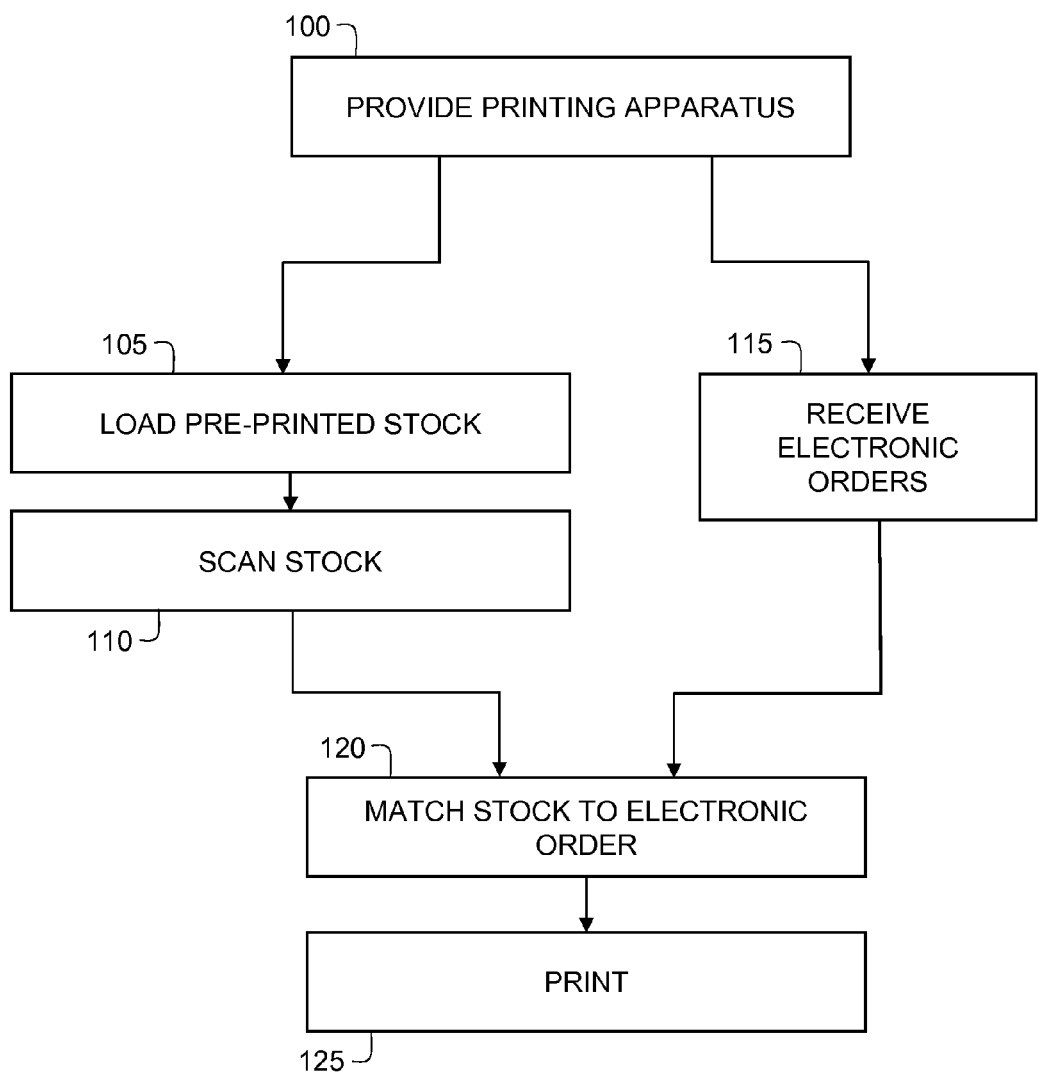
FIG. 7 is a flow diagram illustrating a method according to an embodiment of the present invention.

Referring to FIG. 7, variable customer data can be printed on a large variety of different pre-printed stocks by employing a method according to an embodiment of the present invention comprising the steps of providing a printing apparatus in step 100, for example a printing apparatus 10 such as that illustrated in FIG. 1. Pre-printed stock of a variety of different types can be loaded into a printer, in step 105, the preprinted stock having an open area and a decorative printed area on a common side of the pre-printed stock. The pre-printed stock may have a common size and underlying material (e.g. 5-inch by 7-inch card stock) but have different printing in the printed area. One or more of the pre-printed stocks in the printer tray are scanned with the scanner in step 110 and, after the stock is identified, it is then stored as tray stock information. At the same time as, before, or after the pre-printed stocks are loaded (step 105) and scanned (step 110), the printing apparatus can receive a plurality of different electronic customer orders in step 115. The electronic orders can include unique customer data such as digital images and a selection of pre-printed stock on which the digital image(s) are to be printed. An electronic customer order is matched to the tray stock information describing the available pre-printed stock in step 120. One of the stock information is matched with one of the plurality of different electronic orders to form a match in step 120. Print instructions for the match are produced and the customer data corresponding to the match is printed onto the common side of the matching pre-printed stock in step 125.

In another preferred embodiment of the present invention, the printers may include several paper or media supply drawers or trays, each containing a different pre-printed, plain or colored stock of various sizes and weights. The user or printer operator loads stock of desired types in the one or more supply drawers or trays. Each supply drawer or tray is typically loaded with only one type of stock. When a supply drawer is loaded with media, the controller will indicate that the stock type information may need to be updated. The printers are typically configured with supply drawer or tray sensors that indicate to the printer controller that the drawer or tray has been restocked. Visual indicators, for example, LEDs, can also be coupled via the sensors so that printer operators can quickly discern that stock is loaded into a tray. The actual media type may be entered by the user or printer operator or preferably according to this embodiment of the invention, the printer will feed the first sheet of the supply to be scanned to produce tray stock information, as described above. The printer controller will use the updated tray stock information in matching future print job requirements before printing. According to this embodiment of the invention the user need not enter the media type thus simplifying the media loading process and eliminating possible user error in entering an incorrect media type and/or loading incorrect media in the paper drawer or tray.

Figure 8:
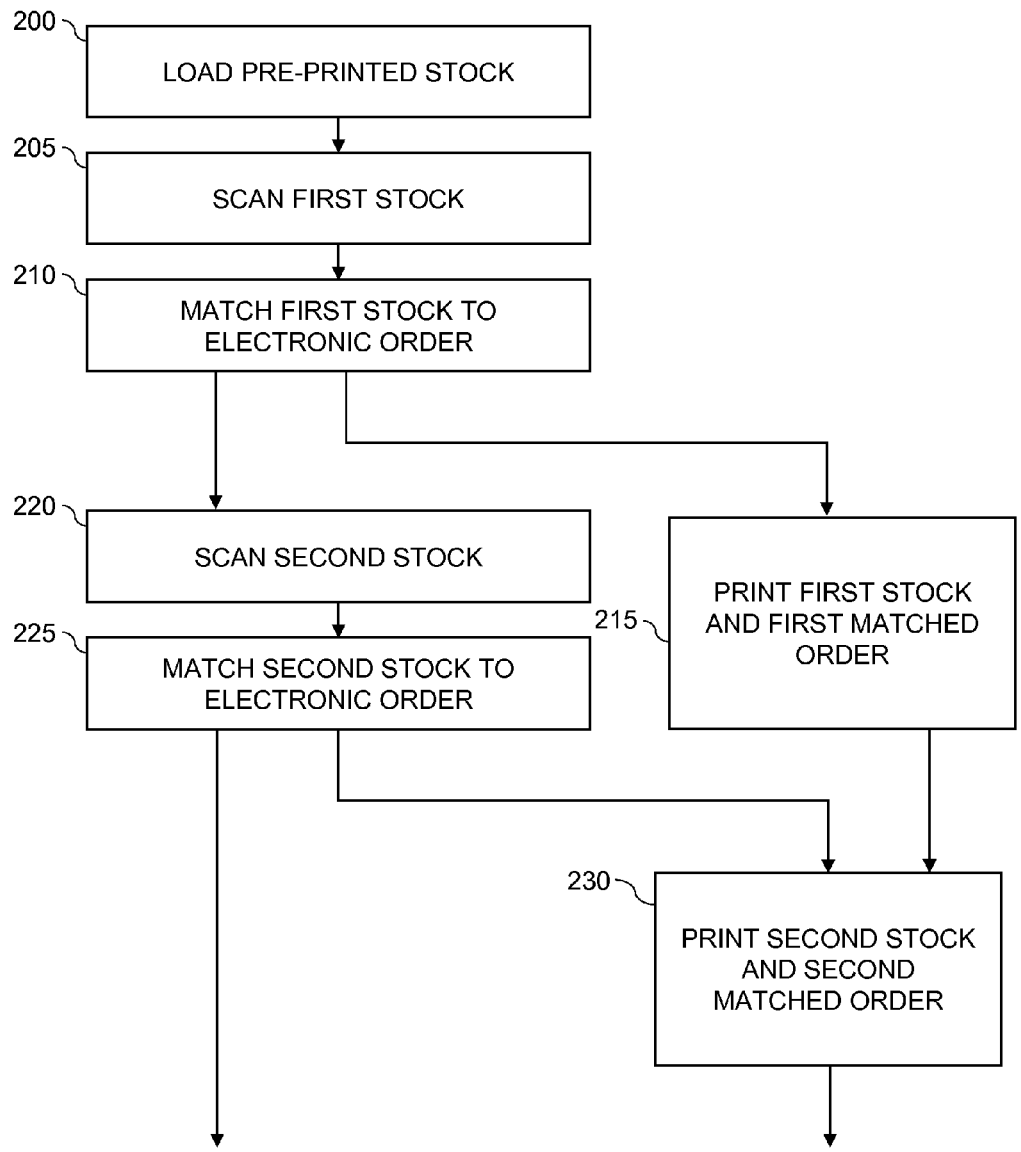
FIG. 8 is a flow diagram illustrating a more detailed method according to an embodiment of the present invention.

In another preferred embodiment of the present invention, an electronic order can be matched to a specific pre-printed stock, for example the first pre-printed stock on the top of a printer tray. In this embodiment, the controller will examine each of the pending electronic customer orders until a match with the specific pre-printed stock is found. Referring to FIG. 8, the pre-printed stock is loaded into a printer tray in step 200. The pre-printed stock in a printer tray can include a variety of different stocks. The first stock (e.g. on the top of the printer tray stack) is scanned in step 205 and matched to an electronic order (not necessarily the first electronic order in a queue representing the order in which the electronic orders were received) in step 210. The first stock and electronic order can be printed in step 215. At the same time, before, or after the first pre-printed stock and matched electronic order are printed, a second stock (e.g. the second pre-printed stock in the printer tray stack) can be scanned and identified in step 220 and then matched to an electronic order in step 225. Once the first pre-printed stock and electronic order print is complete (step 215), the second pre-printed stock and electronic order can be printed in step 230. The process can continue until either the pre-printed stock is exhausted or the electronic orders are completed.

Figure 9:
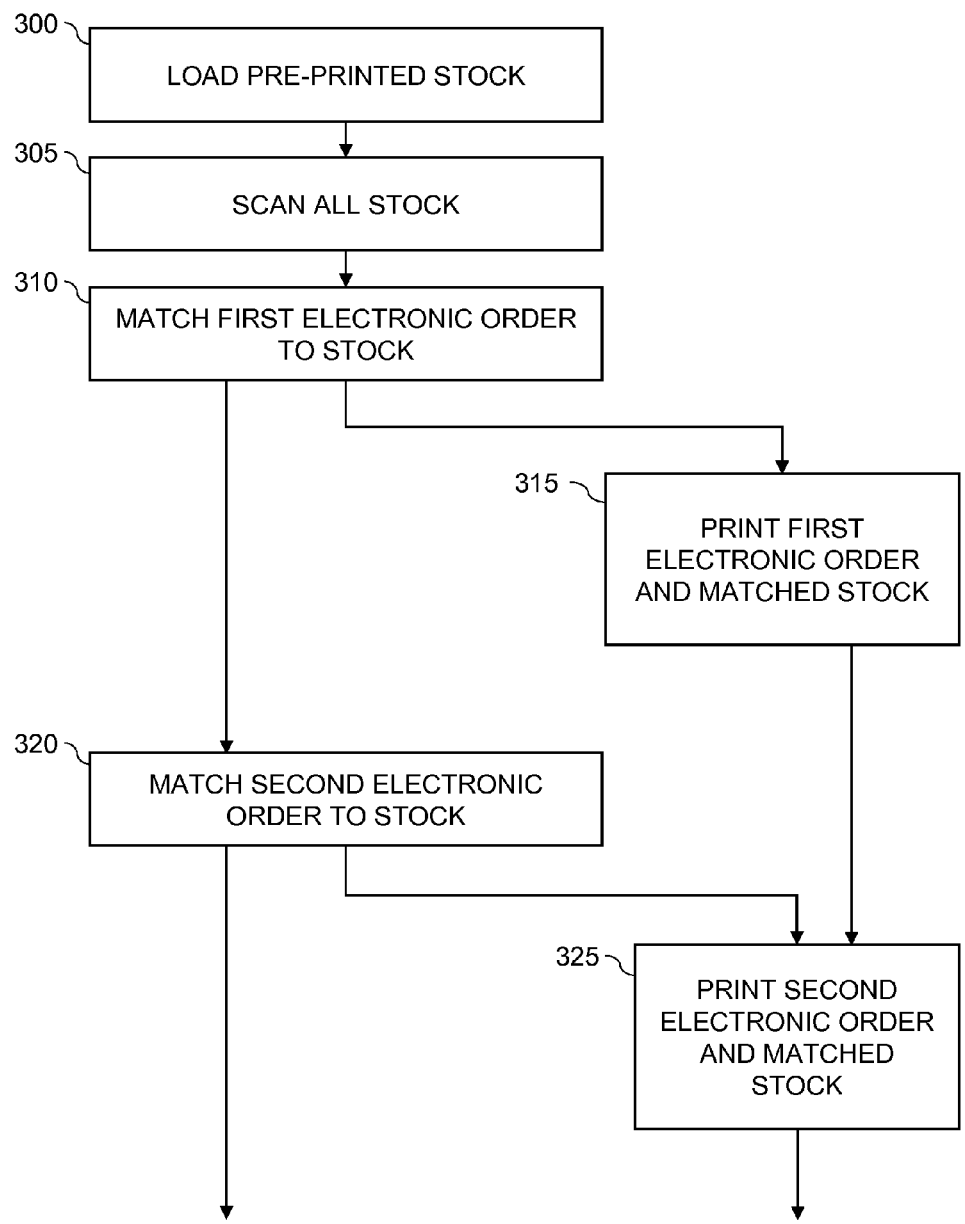
FIG. 9 is a flow diagram illustrating a more detailed alternative method according to an embodiment of the present invention.

In another preferred embodiment of the present invention, a pre-printed stock can be matched to a specific electronic order, for example the first electronic order in a queue representing the order in which the electronic orders were received. In this embodiment, the controller will examine each of the pre-printed stocks until a match is found. Referring to FIG. 9, the pre-printed stock is loaded into a printer tray in step 300. The pre-printed stock in a printer tray can include a variety of different stocks. All of the pre-printed stocks to be matched are scanned in step 305 and a match to the first electronic order found in step 310. The pre-printed stock and first electronic order can be printed in step 315. At the same time, before, or after the first electronic order and matched pre-printed stock are printed, a second electronic order (e.g. the second electronic order in the queue) can be matched to a pre-printed stock in step 320. The second match can be printed in step 325 after the first match is printed in step 315. The process can continue until either the pre-printed stock is exhausted or the electronic orders are completed.

Figure 10:
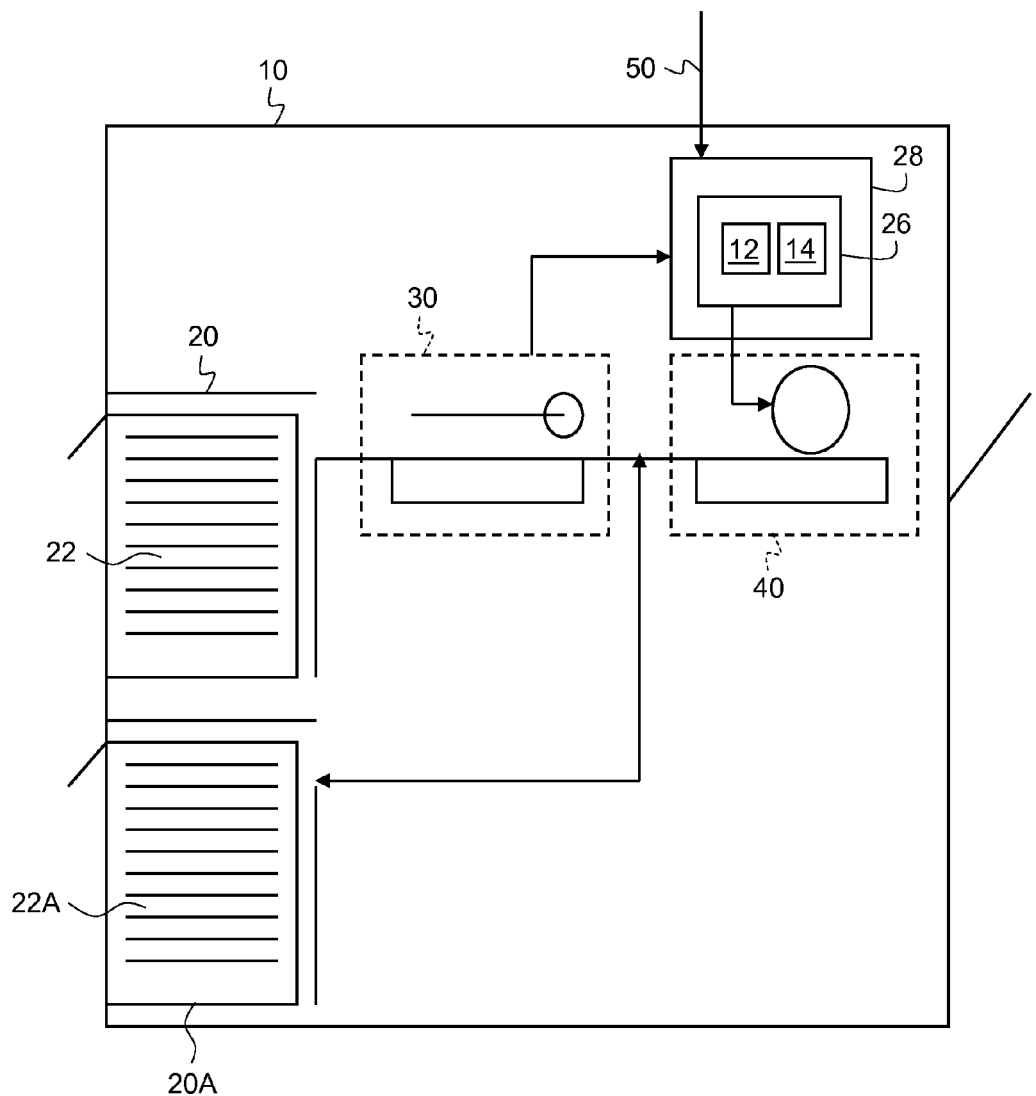
FIG. 10 is a schematic illustration of a printing apparatus in accordance with another embodiment of the present invention.

In another preferred embodiment of the present invention, more than one pre-printed stock can be scanned before the first match is made with an electronic order. As illustrated in FIG. 10, to facilitate the matching and printing process, scanned pre-printed stock can be automatically stored in either a first printer tray 20 or a second printer tray 20A. The identification and order of the pre-printed stocks in the first and second printer trays can be maintained by the controller to facilitate matching and printing. Both the first and the second trays of pre-printed stock can be matched with customer orders, providing increased flexibility in the work flow and matching process. In this implementation, both trays are coupled to the printer and the stock from either tray can be automatically fed into the printer for printing.

In some cases, a scanned pre-printed stock from the first printer tray will not match an electronic order. In one preferred embodiment of the present invention, all of the pending electronic orders can be checked against the scanned pre-printed stock in the first tray and, if no matches are found for any of the pending electronic orders, the scanned pre-printed stock can be moved into the second printer tray. The pre-printed stock can remain in the second printer tray until new electronic orders are received that require the pre-printed stock in the second printer tray. A record identifying the pre-printed stock in the second printer tray can be maintained until a match with an electronic order is found. If a match with an electronic order is subsequently found, the pre-printed stock in the second printer tray can be automatically fed into the printer and the matched electronic order printed on the pre-printed stock from the second printer tray.

In another preferred embodiment of the present invention, a first pre-printed stock from the first printer tray is scanned and matched, if possible, to a previously received and stored electronic customer order, and printed. If no match exists, the first pre-printed stock is moved to the second printer tray and a second pre-printed stock from the first printer tray is scanned and matched, if possible. The process is automatically repeated for the remainder of the pre-printed stock in the first printer tray until a match is found and the electronic order printed. If no match with the previously received and stored electronic customer order is found for any of the pre-printed stock in the first printer tray, additional pre-printed stock is then loaded into the first printer tray, for example by an operator. The process then continues until a match is found or the order is abandoned. If a plethora of pre-printed stock repeatedly has no matching electronic customer orders, the unmatched pre-printed stock can be removed from the system.

Thus, in another preferred embodiment of the present invention, the method further comprises the steps of failing to match the first scanned one of the pre-printed stock from the first tray with any of the electronic orders and then storing the first scanned one of the pre-printed stock in a second printer tray, recording information identifying the first scanned one of the pre-printed stock in the second printer tray, receiving a second electronic order(s), matching the stored first one of the pre-printed stock in the second printer tray with the second electronic order to form a match; and producing print instructions for the match and printing the customer data corresponding to the match onto the matching pre-printed stock.

If a record of the pre-printed stocks in the second printer tray is not maintained then, in another preferred embodiment of the present invention, the pre-printed stock in the second printer tray is scanned again to identify the type of stock in the second printer tray. Thus, one method of the present invention comprises the steps of receiving electronic order(s), scanning the first one of the pre-printed stock in the second printer tray to identify the first one of the pre-printed stocks in the second printer tray, matching the first one of the pre-printed stock in the second printer tray with one of the electronic orders to form a match, and producing print instructions for the match and printing the customer data corresponding to the match onto the pre-printed stock.

The present invention can be employed to support a large variety of different pre-printed stocks in a printing system adapted to print a large number of unique customer orders, especially those including digital images, without requiring the use of special identifying markings or an impractical number of printers or printer trays of stock. The system is adaptable to a wide variety of pre-printed materials and designs.

The invention has been described in detail with particular reference to certain preferred embodiments thereof, but it will be understood that variations and modifications can be effected within the spirit and scope of the invention.

PARTS LIST 10 printing apparatus
12 customer data
13 digital image
14 pre-printed stock selection
15 printed area
16 open area
17 text
18 printed image product
20 printer tray
20A printer tray
22 pre-printed stock
26 electronic customer order
27 messages
28 controller
29 operator interface
30 scanner
32 tray stock information
40 printer
42 match
44 printing instructions
50 network
100 provide printing apparatus step
105 load pre-printed stock step
110 scan stock step
115 receive electronic orders step
120 match stock to electronic order step
125 print step
200 load pre-printed stock step
205 scan first stock step
210 match first stock to electronic order step 215 print first stock and first matched order step
220 scan second stock step
225 match second stock to electronic order step
230 print second stock and second matched order step
300 load pre-printed stock step
305 scan all stock step
310 match first electronic order to stock step
315 print first stock and first matched order step
320 match second electronic order to stock step
325 print second stock and second matched order step

The invention claimed is:

1. A printing apparatus for variable pre-printed stock, comprising:
   storage for customer data;
   pre-printed stocks, each pre-printed stock having a printed area and an open area on a common side of the pre-printed stock;
   a printer tray for holding two or more different pre-printed stocks;
   a scanner for scanning the printed area of each of the pre-printed stocks to form an image of each of the printed areas, for comparing each image of the printed areas with different pre-printed stocks, for matching each image of the printed areas with one of the different pre-printed stocks, for identifying each matched image to produce tray stock information identifying the pre-printed stock, and for storing the produced tray stock information identifying the pre-printed stocks;
   storage for electronic customer orders, each electronic customer order including one or more of the customer data and selection data for one or more of the pre-printed stocks;
   a controller for receiving the tray stock information and the electronic customer orders, for matching the tray stock information to the electronic customer orders to produce an electronic customer order match, and for producing print instructions for the matched electronic customer order; and
   a printer for receiving the print instructions and for printing the customer data corresponding to the matched electronic customer order onto pre-printed stock identified by the matched electronic customer order.

2. The printing apparatus of claim 1, wherein the customer data includes digital images, text, or both.

3. The printing apparatus of claim 1, wherein the controller includes programming for communicating an error message if there is no match between the selection of pre-printed stock and the tray stock information.

4. The printing apparatus of claim 1, wherein the controller includes programming for communicating an error message if there is no pre-printed stock in the printer tray.

5. The printing apparatus of claim 1, wherein the printer ink or toner is incompatible with the printed areas of the pre-printed stock.

6. The printing apparatus of claim 1, wherein the printed areas are printed with metal film.

7. A method of printing customer data on pre-printed stock, comprising the steps of:
   loading a plurality of different pre-printed stocks into a printer, the pre-printed stocks having an open area and a printed area on a common side of the pre-printed stocks;
   scanning the different pre-printed stocks using a scanner to form an image of each of the printed areas, comparing each image of the printed areas with different pre-printed stocks, matching each image of the printed areas with one of the different pre-printed stocks, identifying each matched image to produce tray stock information identifying the pre-printed stock, and storing the produced stock tray information identifying the pre-printed stocks;
   receiving a plurality of electronic orders in the printer, each order identifying one or more of the pre-printed stocks and including customer data;
   matching the stock tray information with two or more of the plurality of electronic orders to form two or more electronic order matches; and
   producing print instructions for the two or more electronic order matches and printing the customer data corresponding to the electronic order matches onto pre-printed stocks identified by the electronic order matches.

8. The method of claim 7, further comprising the step of:
   matching a first one of the scanned pre-printed stocks with one of the electronic orders to form a first match.

9. The method of claim 8, further comprising the step of:
   matching a second scanned one of the pre-printed stocks with one of the different electronic orders to form a second match.

10. The method of claim 7, further comprising the steps of:
    failing to match a first scanned one of the pre-printed stocks with any of the electronic orders; and
    storing the first scanned one of the pre-printed stocks in a no-order printer tray.

11. The method of claim 10, further comprising the step of recording information identifying the first scanned one of the pre-printed stocks in the no-order printer tray.

12. The method of claim 11, further comprising the steps of:
    receiving a second electronic order;
    matching the stored first one of the pre-printed stocks in the no-order printer tray with the second electronic order to form a second match; and
    producing second print instructions for the second match and printing the customer data corresponding to the second match onto the common side of the matching pre-printed stock.

13. The method of claim 10, further comprising the steps of:
    receiving one or more additional electronic order(s);
    scanning the first one of the pre-printed stock in the no-order printer tray to identify the first one of the pre-printed stocks in the no-order printer tray;
    matching the stored first one of the pre-printed stock in the no-order printer tray with one of the additional electronic orders to form a second match; and
    producing second print instructions for the second match and printing the customer data corresponding to the second match onto the common side of the matching pre-printed stock.

14. The method of claim 13 further comprising the step of loading pre-printed stock into the no-order tray.

15. The method of claim 7, further comprising the steps of:
    matching one of the scanned pre-printed stocks with a first electronic order to form a second match;
    selecting the pre-printed stock according to the second match;
    producing print instructions for the second match and printing the customer data corresponding to the second match onto the common side of the selected matching pre-printed stock.

16. The method of claim 15, further comprising the step of moving the scanned plurality of pre-printed stocks to a second printer tray.

17. The method of claim 7, further comprising the step of pre-printing the pre-printed stock by evaporating or laminating a metal film onto the pre-printed stock in the printed area.

18. The method of claim 7, wherein the step of printing the customer data includes the step of printing the customer data only in the open area.

19. The method of claim 7, wherein one of the pre-printed stocks includes a plurality of open areas each surrounded by the printed area and wherein the method further comprises the step of printing the customer data only in the plurality of open areas.

20. The method of claim 7, further including the step of loading different pre-printed stocks into a common printer tray.

21. The method of claim 7, further including the step of comparing the image of the pre-printed stock to a pre-stored image of pre-printed stock.

* * * * *